United States Patent
Weiss et al.

(10) Patent No.: US 8,953,296 B2
(45) Date of Patent: Feb. 10, 2015

(54) AC PRE-CHARGE CIRCUIT

(75) Inventors: Bruce W. Weiss, Milwaukee, WI (US);
Doyle F. Busse, Muskego, WI (US);
Jeremy J. Keegan, Kewaskum, WI (US); Lixiang Wei, Whitefish Bay, WI (US); Michael W. Loth, Germantown, WI (US); Rangarajan M. Tallam, Germantown, WI (US); Yogesh Patel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 140 days.

(21) Appl. No.: 13/548,753

(22) Filed: Jul. 13, 2012

(65) Prior Publication Data
US 2013/0119903 A1    May 16, 2013

Related U.S. Application Data

(60) Provisional application No. 61/559,645, filed on Nov. 14, 2011.

(51) Int. Cl.
*H02H 1/00* (2006.01)
*H02H 7/125* (2006.01)
*H02H 9/00* (2006.01)

(52) U.S. Cl.
CPC .............. *H02H 7/125* (2013.01); *H02H 9/001* (2013.01)
USPC .......................................... 361/114; 361/118

(58) Field of Classification Search
USPC ............ 361/5, 6, 100, 114, 437, 118; 307/31; 318/727, 800
See application file for complete search history.

(56) References Cited

U.S. PATENT DOCUMENTS

| 4,905,300 | A | * | 2/1990 | Bhagwat et al. | 388/800 |
|---|---|---|---|---|---|
| 5,502,609 | A | * | 3/1996 | Thomas et al. | 361/6 |
| 5,883,486 | A | * | 3/1999 | Earhart et al. | 318/778 |
| 6,339,309 | B1 | * | 1/2002 | Bixel et al. | 318/727 |
| 7,407,048 | B2 | * | 8/2008 | Boom | 198/323 |
| 7,468,565 | B2 | * | 12/2008 | Hoshiba | 307/10.1 |
| 7,669,430 | B2 | * | 3/2010 | Matsui et al. | 62/87 |
| 7,830,036 | B2 | * | 11/2010 | Wei et al. | 307/31 |
| 2010/0229581 | A1 | * | 9/2010 | Truckenbrod et al. | 62/236 |
| 2011/0205676 | A1 | * | 8/2011 | Divan | 361/56 |

OTHER PUBLICATIONS

User Manual Active Front End Unit (AFE), Vacon Driven by Drives, pp. 1-93, http://www.vacon.com/ImageVaultFiles/id_2783/cf_2/Vacon-NX-AFE-User-Manual-ud01190B-EN.PDF (accessed Nov. 29, 2012).

(Continued)

*Primary Examiner* — Eduardo Colon Santana
*Assistant Examiner* — Bickey Dhakal
(74) *Attorney, Agent, or Firm* — Fletcher Yoder, P.C.

(57) ABSTRACT

AC pre-charging techniques are provided for pre-charging the DC bus on a motor drive. AC pre-charging techniques involve pre-charge circuitry including a manual switch, an automatic switch, and pre-charge control circuitry to switch the automatic switch between pre-charge and pre-charge bypass modes in response to an initialized pre-charge operation, input voltage sags, etc. In some embodiments, the pre-charge operation may be initialized by switching the manual switch closed. In some embodiments, the pre-charge operation may also be initialized by a detected voltage sag on the DC bus. The pre-charge circuitry may also be configured to disconnect a motor drive from the AC power supply under certain fault conditions.

22 Claims, 7 Drawing Sheets

(56) References Cited

OTHER PUBLICATIONS

Hardware Manual, ACS800-11 Drives (5.5 to 110 kW), ACS800-11 Drives (7.5 to 125 HP), ABB, May 5, 2006, pp. 1-126, http://www05.abb.com/global/scot/scot201.nsf/veritydisplay/055992b565d4ae88c1257790004a79ad/$file/en_acs800_11_hw_b_updatenotice.pdf.

Sinamics G150, Converter Cabinet Units 75 kW to 1500 kW, Operating Instructions, Siemens, Oct. 2008, pp. 1-490, http://cache.automation.siemens.com/dnl/DQ/DQxNzMxNQAA_35201129_HB/g150-operating-instructions-1008-en.pdf (accessed Nov. 29, 2012).

* cited by examiner

AC PRE-CHARGE CIRCUIT

CROSS-REFERENCE TO RELATED APPLICATIONS

This application claims the benefit of U.S. Provisional Application No. 61/559,645, filed Nov. 14, 2011.

BACKGROUND

The present disclosure relates generally to the field of electrical drives. More particularly, the disclosure relates to techniques for pre-charging an AC circuit in a power drive.

In the field of power electronic devices, a wide range of circuitry is known and currently available for converting, producing and applying power to loads. Depending upon the application, motor drive systems may include circuitry that converts incoming power from one form to another as needed by the load. In a typical drive system, for example, rectifier circuitry converts alternating current (AC) power (such as from a utility grid or generator) to direct current (DC) power. Inverter circuitry can then convert the DC signal into an AC signal of a particular frequency desired for driving a motor at a particular speed. The rectifier circuitry and the inverter circuitry typically include several high power switches, such as insulated-gate bipolar transistors (IGBTs), controlled by drive circuitry. Motor drive systems also often include power-conditioning circuitry, including capacitors and/or inductors, which remove undesirable ripple currents on the DC bus.

Sometimes during operation of a motor drive system, and particularly during start-up, the drive circuitry may draw high levels of current due to the charging of power conditioning capacitors on the DC bus. Furthermore, power-conditioning capacitors (e.g., LCL capacitors) on the AC bus may also be susceptible to high current levels. To avoid a high in-rush current during start-up, a typical motor drive system may include pre-charge circuitry that applies a smaller initial current to the AC bus of the drive prior to start-up to charge the DC power-conditioning capacitors before applying a full source voltage. Such techniques may be referred to as AC pre-charging.

Typical AC pre-charging techniques involve circuitry that may not be suitable for pre-charging the power-conditioning capacitors. Furthermore, conventional techniques may not be efficiently sized for AC pre-charging and isolating the motor drive from the AC supply during fault conditions.

BRIEF DESCRIPTION

The present disclosure relates generally to techniques for pre-charging the AC circuitry on a motor drive. Specifically, AC pre-charge circuitry includes a fused disconnect switch, an automatic switch, a pre-charge contactor, and pre-charge control circuitry to switch the automatic switch and/or the pre-charge contactor between a pre-charge mode, a pre-charge bypass mode, or an isolation mode. In some embodiments, the pre-charge mode may be initialized by manually switching the fused disconnect switch closed. Once the pre-charge operation is complete, the automatic switch may be automatically closed by the pre-charge control circuitry, and the inverter circuitry of the motor drive may operate. The pre-charge control circuitry may be configured to detect various fault conditions, such as voltage drops in the AC or DC bus, power losses, faults of the fused disconnect switch, faults of the pre-charge contactor, and/or faults of the automatic switch. The AC pre-charge control circuitry may also be configured to isolate the drive from the AC power source after detection of certain fault conditions. In some embodiments, the AC pre-charge circuitry may be sufficiently compact to fit in a single cabinet in a motor drive.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Systems and methods of the present disclosure are related to pre-charging the DC bus on a motor drive in a motor drive system. During operation of a motor drive system, and particularly during start-up, drive circuitry may draw high levels of current due to the charging of the power-conditioning capacitors in each motor drive. Typically, motor drive configurations include pre-charge circuitry that applies a smaller initial current to the DC bus of the drive prior to start-up to charge the capacitors before applying a full voltage source. Pre-charging the capacitors with the smaller initial current may protect the capacitors from possible damage by avoiding the high in-rush current during start-up. Some existing pre-charge techniques may not be suitable for addressing various fault conditions that may occur after the motor drive has begun to operate. Moreover, some existing techniques may not properly isolate a motor drive from the AC power supply when the motor drive is in fault.

Embodiments of the present disclosure include pre-charge circuitry suitable for addressing line sags during drive operation and for isolating a drive from the AC power supply under certain fault conditions. The pre-charging circuitry includes circuitry configured on the AC side of a motor drive and may also pre-charge the power-conditioning circuitry on the AC side of the drive. As the pre-charging circuitry is on the AC side of the motor drive, the circuitry may also be suitable for isolating a drive in fault from the AC power supply, thereby protecting a drive in fault from current influx. Furthermore, in some embodiments, the pre-charge circuitry configuration may utilize automatic switches such as a molded case switch for drive isolation and may not need to use a circuit breaker.

Such embodiments may be sufficiently compact to fit in a single cabinet in a motor drive.

Figure 1:
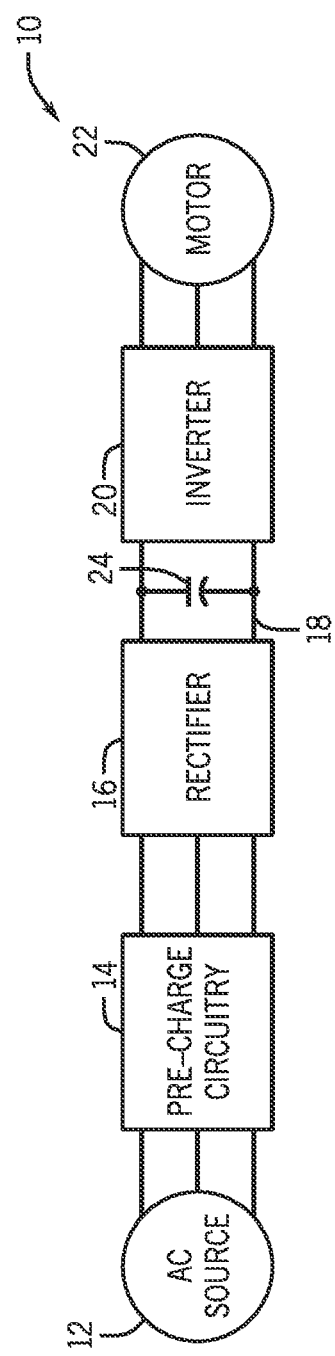
FIG. 1 is a diagrammatical representation of a motor drive, in accordance with an embodiment.

FIG. 1 is a diagrammatical representation of a motor drive 10 having AC pre-charge circuitry 14 in accordance with an embodiment of the present disclsoure. The motor drive 10 may be powered by an AC power source 12 and may include a rectifier 16 that rectifies the AC power from the AC source 12 to DC current on a DC bus 18. The DC current may flow through a DC bus 18 to an inverter 20 that generates a three-phase output waveform at a desired frequency for driving a motor 22. The motor drive may also include a capacitor 24 connected across the DC bus 18 between the rectifier 16 and the inverter 24 of the drive 10. The capacitor 24 may include power-conditioning capacitors that may be used to provide a DC voltage on the DC bus 18 during line sags and the like.

In some embodiments, the AC pre-charge circuit 14 reduces the in-rush current that may otherwise occur when power is first applied to the motor drive 10. A high in-rush current can be caused, when the capacitor 24 (e.g., bank of capacitors) briefly behaves like a short circuit after voltage is applied to the DC bus 18 and before sufficient charge is stored. Generally, the AC pre-charge circuit 14 may reduce in-rush current by pre-charging the DC bus 18 during an initial charging stage such that the capacitor 24 charges to an approximate bus voltage.

Figure 2:
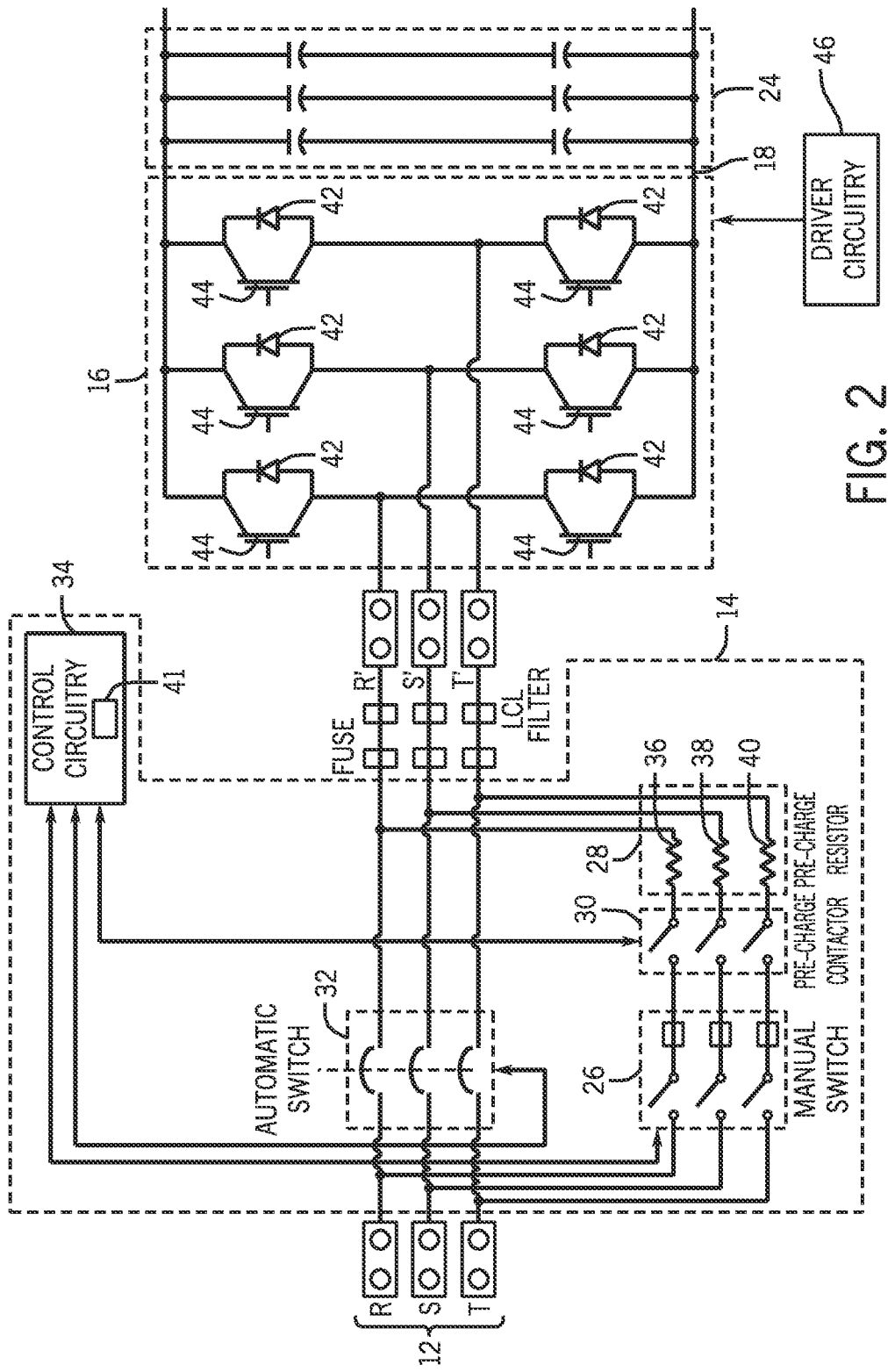
FIG. 2 is a diagrammatical representation of AC pre-charge circuitry in the motor drive of FIG. 1, in accordance with an embodiment.

FIG. 2 is a diagrammatical representation of a portion of the motor drive 10 illustrated in FIG. 1 that employs pre-charge circuitry 14 in accordance with an embodiment. The pre-charge circuitry 14 may include manual pre-charge switches 26. The manual pre-charge switches 26 may be connected to each of the AC buses from the AC power source 12. In some embodiments, the manual pre-charge switches 26 may include manual fused disconnect switches. The pre-charge circuitry 14 includes pre-charge resistors 28 connected in series to the manual pre-charge switches 26. Each of the pre-charge resistors 28 may be connected to one of the manual pre-charge switches 26. In some embodiments, pre-charge contactors 30 may be connected in series between the manual switches 26 and the pre-charge resistors 28. The contactors 30 may be suitable for disconnecting the pre-charge resistors 28 during conditions such as a short circuit to protect the pre-charge resistors 28 from a high influx of AC current.

The pre-charge circuitry 14 may also include automatic pre-charge switches 32 connected to each of the AC buses from the AC power source 12. The automatic pre-charge switches 32 may be controlled by pre-charge control circuitry 34 in the pre-charge circuitry 14. The pre-charge control circuitry 14 may include a communication component, a processor, a memory, a storage, input/output (I/O) ports, and the like. The communication component may be a wireless or wired communication component that may facilitate communication between the pre-charge control circuitry 14, the manual switches 26, the automatic switches 32, and the like. The processor may be any type of computer processor or microprocessor capable of executing computer-executable code. The memory and the storage may be any suitable articles of manufacture that can serve as media to store processor-executable code. These articles of manufacture may represent computer-readable media (i.e., any suitable form of memory or storage) that may store the processor-executable code used by the processor to perform the presently disclosed techniques.

In some embodiments, the automatic switches 32 may include a motorized molded case switch, and the pre-charge control circuitry 34 may control the opening or closing of the automatic switches 32 by applying power to a coil or motor of the automatic switches 32. In the illustrated embodiment, the pre-charge resistors 28 include three resistors; specifically, pre-charge resistors 36, 38, and 40. The pre-charge control circuitry 34 may be connected to each side of the pre-charge resistors 36, 38, and 40 to sense the voltage drop across the pre-charge resistors 36, 38, and 40. Based on the sensed voltage drop, the pre-charge control circuitry 34 may control the opening or closing of the automatic switches 32. In some embodiments, the pre-charge control circuitry 34 may also include a transformer 41 configured to provide power to various pre-charge operations. For instance, the transformer 41 may power one or more coils or motors for closing or opening the automatic switches 32.

Generally, while the capacitor 24 (e.g., capacitor bank) on the DC bus 18 of the drive 10 is charging during a pre-charge operation, the manual switches 26 are closed while the automatic switches 32 are open, and the pre-charge control circuitry 34 enables the delivery of power from the AC power supply 12 through the closed manual switches 26, the fuses, and the LCL filter on the AC bus. Because the automatic switches 32 are open, the pre-charge current may flow through the closed manual switches 26 and the pre-charge resistors 28, and the current drawn on the DC bus 18 may be controlled to an acceptable value known in the art while the capacitor 24 charges. After a suitable time period has elapsed, or after a threshold voltage on the DC bus 18 has been met, the pre-charge control circuitry 26 may close the automatic switches 32 to bypass the pre-charge resistors 28, thereby automatically disconnecting the pre-charge resistors 28 from the motor drive 10. In one embodiment, the voltage of the DC bus 18 may be determined based on an AC voltage measured across the pre-charge resistors 28. By charging the capacitor 24 to a voltage close to the DC bus voltage, excessive in-rush currents may be substantially avoided.

Although not shown, in some embodiments the motor drive 10 may include power-conditioning capacitors (e.g., LCL circuitry) on the AC bus between the rectifier 16 and the automatic switch 32. In this manner, the pre-charge control circuitry 26 may pre-charge the AC power-conditioning capacitors such that the inrush current to these power-conditioning capacitors may also be reduced when the drive 10 starts.

Figure 3:
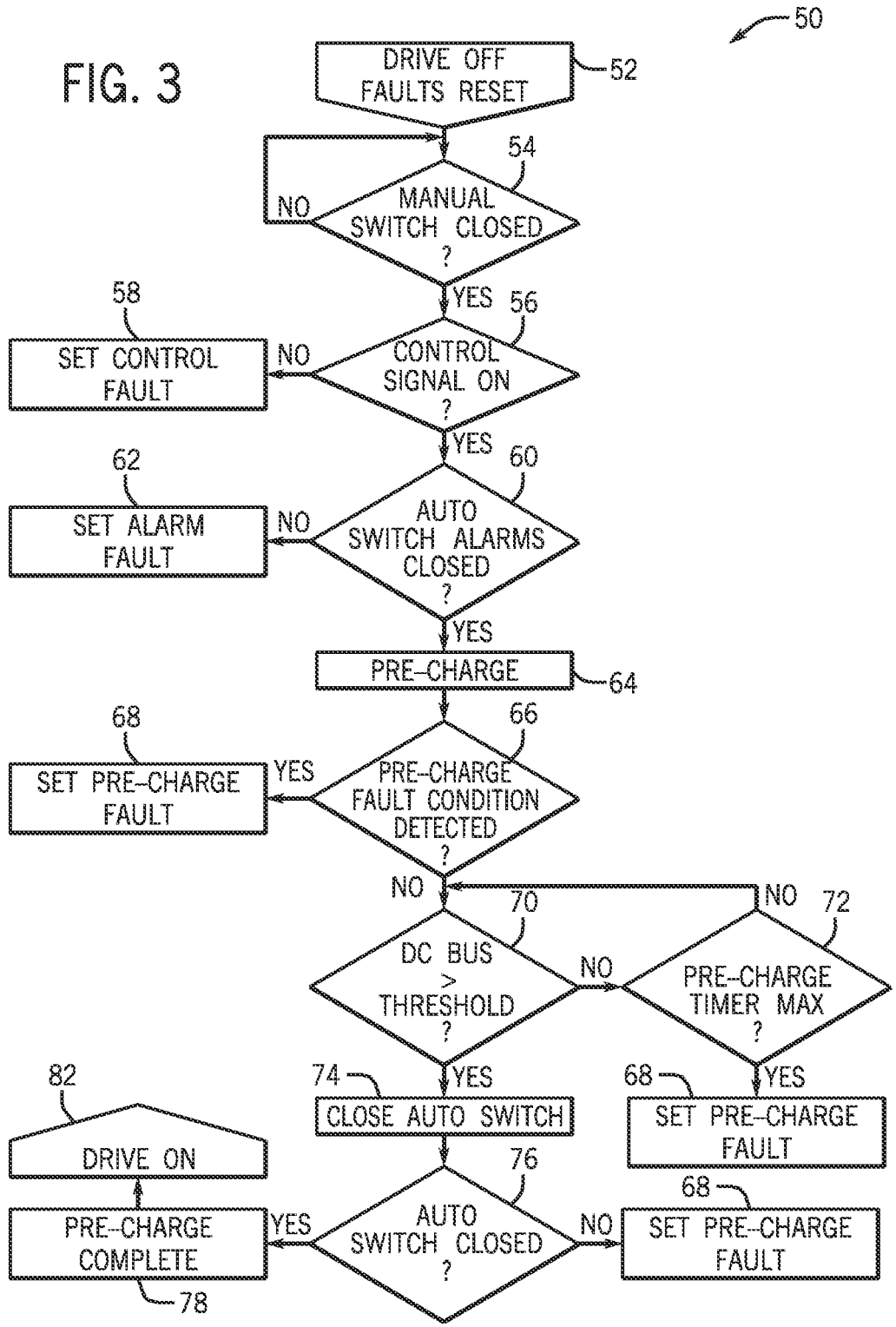
FIG. 3 is a flow chart representing a process for pre-charging the DC bus using the AC pre-charge circuitry of FIG. 2, in accordance with an embodiment.
Figure 4:
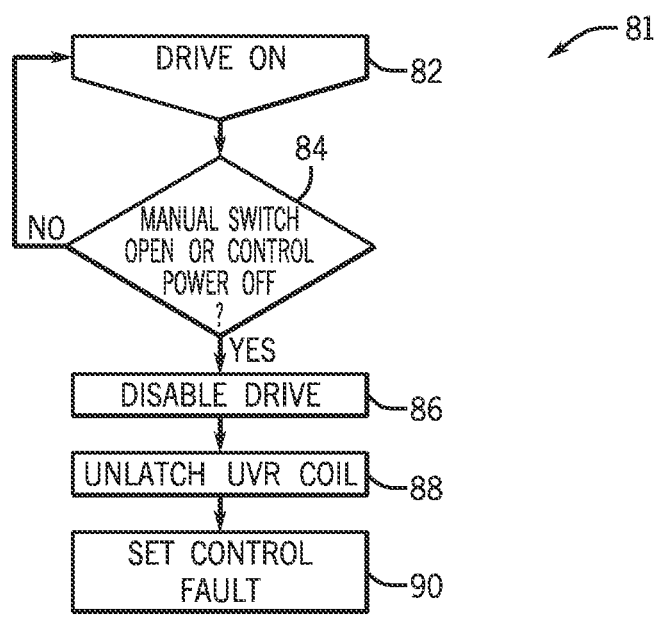
FIG. 4 is a flow chart representing a process for resetting the AC pre-charge circuitry of FIG. 2 when a manual switch or control fault is detected, in accordance with an embodiment.
Figure 5:
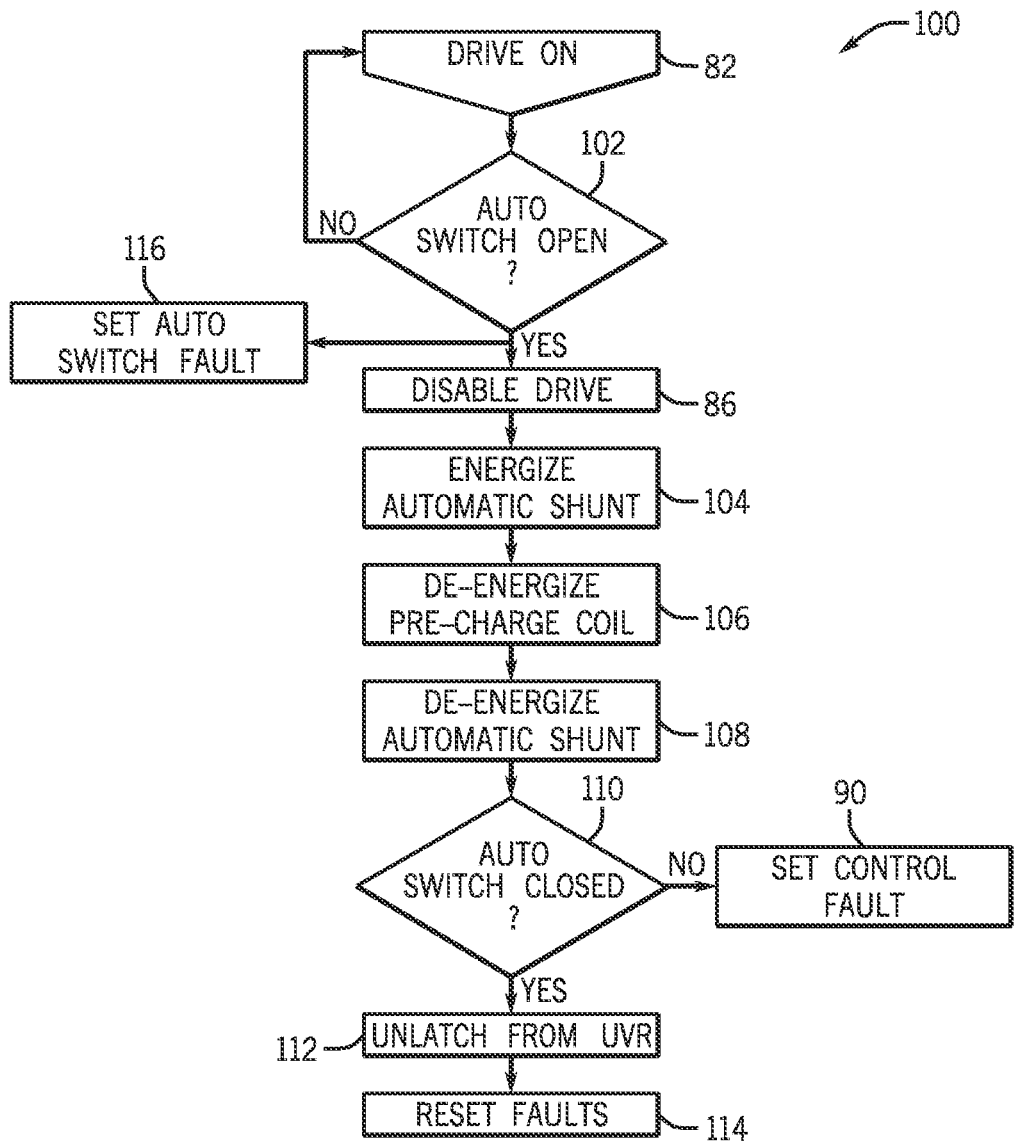
FIG. 5 is a flow chart representing a process for resetting the AC pre-charge circuitry of FIG. 2 when a fault is detected in the automatic switch, in accordance with an embodiment.
Figure 6:
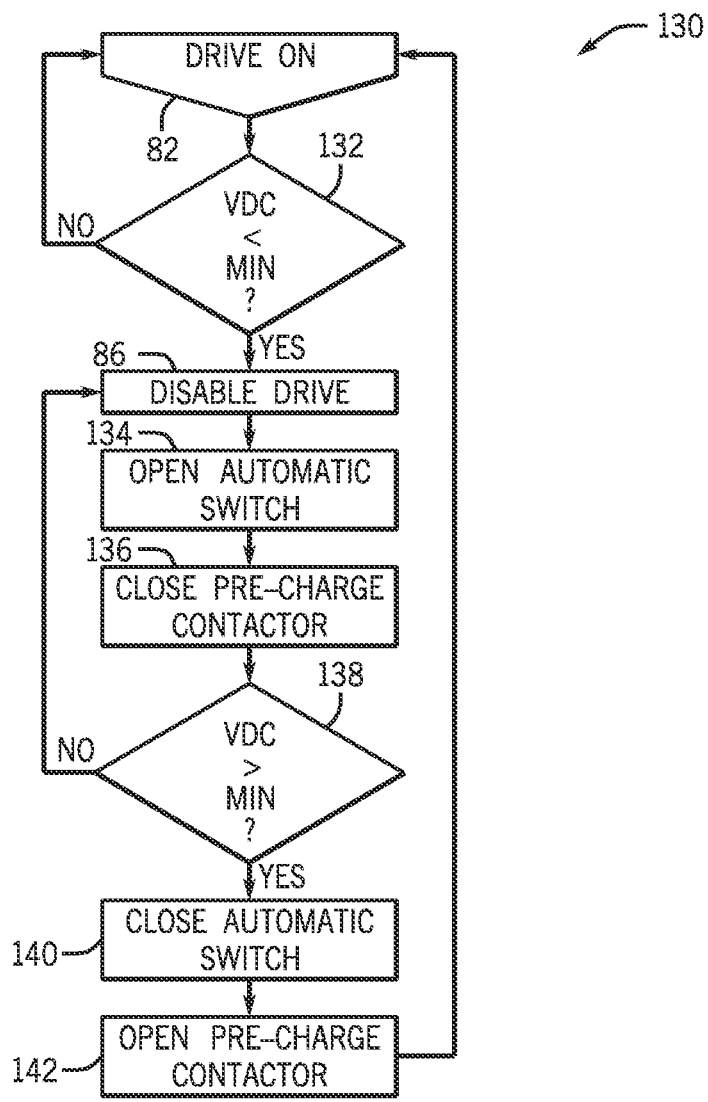
FIG. 6 is a flow chart representing a process for resetting the AC pre-charge circuitry of FIG. 2 when a drop in the DC bus voltage is detected, in accordance with an embodiment.

More detailed explanations of various embodiments for operating the pre-charge circuitry 14 in a motor drive 10 are discussed in the flow charts of FIGS. 3-6. FIG. 3 is a flow chart representing initializing a pre-charge operation. FIGS. 4-6 are flow charts representing processes for resetting the pre-charge circuitry 14 in various fault conditions. More specifically, FIG. 4 is a flow chart for resetting the pre-charge circuitry 14 if the manual switch is open or the control power is off. FIG. 5 is a flow chart for resetting the pre-charge circuitry 14 if the automatic switch 32 opens or trips during operation. FIG. 6 is a flow chart for resetting the pre-charge circuitry 14 if a drop in the DC bus voltage is detected. As the flow charts of FIGS. 3-6 refer to components discussed with respect to FIGS. 1 and 2, the flow charts of FIGS. 3-6 may each be discussed concurrently with FIGS. 1 and 2. Furthermore, as used herein, all of the manual switches 26 may be referred to generally as the manual switch 26, though in some embodiments, each of the manual switches 26 may be independently controlled. Similarly, all of the automatic switches 32 may be referred to generally as the automatic switch 32, though in some embodiments, the pre-charge control circuitry 34 may control each of the automatic switches 26 independently.

Beginning first with FIG. 3, an AC pre-charge operation 50 may begin (block 52) when the motor drive 10 is off and when any previously detected faults have been reset. In this condition, the automatic switch 32 may be open. The pre-charge control circuitry 34 may determine (block 54) whether the manual switch 26 is closed. In some embodiments, the manual switch 26 may be closed or opened by an operator of the motor drive 10, and the manual switch 26 may be manually closed by the operator before activating the motor drive 10. If the manual switch 26 is closed, a pre-charge operation may be initialized, and the pre-charge control circuitry 34 may be activated. This initialization and activation may involve determining (block 56) whether the control circuitry 34 is powered. For example, the control circuitry 34 may transmit a control signal indicative of proper functioning of the control circuitry 34. In one embodiment, after the manual switch 26 closes, the pre-charge control circuitry 34 may be powered using the AC source 12 and a transformer connected to the pre-charge control circuitry. If the control signal is determined (block 56) to be on, indicating proper functioning of the control circuitry 34, the process 50 continues. If the control signal is not found to be on, the control circuitry 34 is set (block 58) to fault and the process 50 ends.

The process 50 may also include checking other features or elements of the motor drive 10 and/or the pre-charge circuitry 14 to determine whether the drive 10 is in a suitable condition for pre-charging. For example, status indicators or alarms of the pre-charge circuitry 34 may be checked to insure that alarms or status indicators will function properly if certain conditions should be indicated during operation of the drive 10. For example, as the automatic switches 32 are typically closed during normal operation of the drive 10, an alarm may be set to indicate when the automatic switches 32 are open during operation of the drive 10. The process 50 may determine (block 60) whether the alarms are closed and suitable for indicating a status of the automatic switches 32. If the alarms are not closed, the process 50 may set (block 62) an alarm fault. If the alarms are closed, the process 50 continues.

If the pre-charge circuitry 14 (including the control circuitry 34 and alarms) are in a condition to begin the pre-charge, the process 50 may begin pre-charging (block 64) the DC bus by closing the pre-charge contactors 30, thereby charging the capacitor 24 and/or other power conditioning circuitry of the motor 10. The control circuitry 34 may draw power from the AC power source 12 until a suitable threshold voltage is drawn to the DC bus 18. In one embodiment, the power drawn from the AC power source 12 (i.e., AC power) may be provided to the rectifier 16, which may convert the AC power to DC power via diodes 42, as illustrated in FIG. 2. In this case, switching devices 44 in the rectifier 16 may be in an open position while the DC bus 18 is pre-charging. In certain embodiments, the switching devices 44 may be controlled using circuitry dedicated to sending signals to the switching devices 44 (e.g., driver circuitry) or the like.

Once a suitable threshold voltage on the DC bus 32 has been reached, the control circuitry 34 may determine that the capacitor(s) 24 and/or other components has been appropriately pre-charged. For example, the threshold may be approximately 700V in some embodiments, though the threshold may be different depending on different types of motor drives 10. In some embodiments, during pre-charging, current flows through the pre-charge resistors 28. As such, the current draw on the DC bus 18 may be controlled while the capacitor 24 charges.

During pre-charging (block 64), the various fault conditions may be monitored (as will be discussed in greater detail with regard to FIGS. 4-6) by the control circuitry 34. If the control circuitry 34 determines (block 66) that a pre-charge fault condition has been detected, the control circuitry 34 may set (block 68) a pre-charge fault and the process 50 may end.

If the pre-charge operation is normal and no faults are detected, the control circuitry 34 may monitor the voltage on the DC bus 18. The control circuitry 34 may measure the DC bus voltage to determine (block 70) whether the DC bus voltage is above the threshold, indicating that pre-charging is complete. The control circuitry 34 may continue to detect the DC bus voltage until the pre-charge timer is timed out. If the control circuitry 26 determines (block 72) that the pre-charge timer has timed out while the threshold voltage has not been met, the control circuitry 34 may set (block 68) the pre-charge operation to a pre-charge fault condition and end the process 50, as an appropriate DC bus voltage has not been reached within a pre-charge time. In some embodiments, a pre-charge fault may indicate to an operator that one or more components of the pre-charge operation must be repaired, replaced, and/or reset. The pre-charge fault may be reset to restart the pre-charge operation 50.

In some embodiments, if the pre-charge control circuitry 34 determines (block 70) that the DC bus voltage is greater than the threshold, the control circuitry 34 may proceed to close (block 74) the automatic switch 32 to begin operating the motor drive in a pre-charge bypass mode. The control circuitry 34 may verify (block 76) that the automatic switch 32 has been closed. If the automatic switch 32 has not been properly closed, the control circuitry may set (block 68) the pre-charge operation to a pre-charge fault condition and end the process 50. By setting the pre-charge operation to a pre-charge fault, the control circuitry 34 may also remove power or de-energize any motors or coils in the pre-charge circuitry 14. Such a fault may indicate to an operator that the automatic switch 32 may need repair or attention.

If the control circuitry 34 determines (block 76) that the automatic switch 32 has properly closed, the control circuitry 26 may indicate (block 78) a successful pre-charge operation and may open the pre-charge contactor 30 such that the pre-charge resistors 28 are completely removed from the drive 10. The motor drive 10 may then be activated in a pre-charge bypass mode (block 80). As such, the control circuitry 34 may send gate signals to the switching devices 44 in the rectifier 16, which may provide DC power to the inverter 20.

FIG. 4 is a flow chart representing a process 81 for resetting the pre-charge circuitry 14 while the drive is on (block 82) and the pre-charge circuitry 14 is operating in a pre-charge bypass mode. The process 81 may reset the pre-charge circuitry 14 if the control circuitry 34 detects (block 84) that the manual switch 26 is open and/or the power to the control circuitry 34 is off. If the manual switch 26 is open, then the pre-charge circuitry 14 may not be able to switch operation from pre-charge bypass mode to pre-charge mode, even if the voltage in the DC bus drops. Furthermore, if the power to the control circuitry 34 is off, the pre-charge circuitry 14 may not have a controller, and the motor drive 10 may not be properly monitored. In each of these conditions, the drive 10 may not be able to properly switch out of a pre-charge bypass mode operation. As such, the process 81 may disable (block 86) the drive. Disabling (block 86) the drive 10 may include disabling one or more components of the drive 10, such as the rectifier 16. The process 80 may also unlatch (block 88) the under-voltage release (UVR) coil. Unlatching the UVR coil may cause the automatic switch 32 to open or remain open, isolating the drive 10 from the AC power supply 12. In one embodiment, the control circuitry 34 may also open the pre-charge contactors 30 such that the drive 10 is completely isolated form the AC source 12. The process 80 may then set (block 90) a control fault. A control fault may indicate to an operator that control circuitry and/or user components (e.g., the manual switches 26) of the pre-charge circuitry 14 may be in fault.

FIG. 5 is a flow chart representing a process 100 for resetting the pre-charge circuitry 14 while the drive is on (block 82) and the pre-charge circuitry 14 is operating in a pre-charge bypass mode. The process 100 may reset the pre-charge circuitry 14 if the control circuitry 34 detects (block 102) that the automatic switch 32 is open. As the automatic switch 32 typically remains closed during normal operation in a pre-charge bypass mode, an open automatic switch 32 may indicate a fault condition. The process 100 may set (block 116) an automatic switch fault if such a condition is detected.

The control circuitry 34 may then disable (block 86) the drive 10 by disabling one or more components of the drive 10, such as the rectifier 16 to protect components in the pre-charge circuitry 14 from the AC current. The control circuitry 34 may also energize (block 104) an automatic shunt (not shown) while de-energizing (block 106) a pre-charge coil (not shown). The automatic shunt may open the automatic switch 32, and de-energizing the pre-charge coil may stop the pre-charging to protect pre-charge components (e.g., the pre-charge resistors 28 when the automatic switch 32 is open. Once the automatic shunt is sufficiently energized, the process 100 may de-energize (block 108) the automatic shunt and determine (block 110) whether the automatic switch 32 is closed. If the automatic switch 32 is open, the control circuitry 26 may set (block 90) a control fault, which may indicate to an operator that control circuitry and/or user components of the pre-charge circuitry 14 may be in fault. If the automatic switch 32 is still closed, then the automatic shunt may not have properly opened the automatic switch 32, and the control circuitry 34 may unlatch (block 112) power (e.g., the 240V) from the UVR to open the automatic switch 32. The control circuitry 34 may then reset (block 114) all faults.

FIG. 6 is a flow chart 130 representing a process for resetting the pre-charge circuitry 14 if a drop in the DC bus voltage is detected while the motor drive 10 is operating (block 82). As used herein, a motor drive 10 having a drop in DC bus voltage during operation may be referred to as a faulted drive. The pre-charge reset process 130 may essentially begin (block 86) when the motor drive 10 is on and the pre-charge control circuitry 34 determines (block 132) that the DC bus voltage has dropped below a minimum threshold for some period of time (e.g., 1500 ms). In some embodiments, if the DC bus voltage drops below the minimum threshold for more than the period of time, various components may be susceptible to damage, particularly for high power DC input drives. The minimum threshold may depend on various factors, such as the components used in the motor drive 10, the current limits of the DC bus, and/or other operating conditions of the motor drive 10. When a sufficient voltage drop is detected (block 132), either the pre-charge control circuitry 34 or any other suitable controller of the motor drive 10 may disable (block 86) the drive 10, open (block 134) the automatic switch 32, and close (block 136) the pre-charge contactor 30 such that the drive 10 may reenter its pre-charge mode and the capacitors 24 may be charged to a certain threshold.

After the drive 10 reenters its pre-charge mode, the pre-charge control circuitry 34 may monitor the DC bus voltage and determine (block 138) whether the DC bus voltage exceeds the minimum threshold. Once the DC bus voltage exceeds the minimum threshold, the control circuitry 34 may close (block 140) the automatic switch 32, open (block 142) the pre-charge contactor 30, and return (block 82) the drive 10 to its normal operating mode.

Keeping the foregoing in mind, the motor drive 10 may automatically switch from a pre-charge bypass mode during normal drive operations to a pre-charge mode when DC bus voltage drops are detected. Therefore, because the switch to pre-charge mode may be substantially automatic, an operator need not constantly monitor multiple motor drives 10 for voltage drops or other faults. By automatically switching to pre-charge mode during DC voltage drops, the motor drive 10 may recover safely without causing substantial harm to motor drive components. If the fault condition cannot be cured by operating the motor drive 10 in pre-charge mode, a motor drive 10 in fault may be isolated from the AC power supply, such that other motor drives 10 connected in a drive system that are not in fault may not be harmed and/or may continue to operate in the system. Moreover, due to the relatively small size of the automatic switch 32, the size of the motor drive 10 may be reduced, as the drive 10 may not need to use a relatively larger circuit breaker for drive isolation.

In some embodiments, the control circuitry 34 may output the faults (e.g., control fault, alarm fault, automatic switch fault, pre-charge fault, bus UV fault) to an operator (e.g., via a display or saved in memory to be retrieved by the operator), such that the operator may address one or more fault conditions. For instance, based on the fault conditions output to an operator, the operator may replace an automatic switch 32 or repair pre-charge circuitry 14. Furthermore, as discussed with respect to FIGS. 3 and 4, the processes for initiating a pre-charge mode operation or monitoring a pre-charge bypass mode operation, determining (blocks 54 and 84, respectively) whether the manual switch 26 is open may involve providing indication for an operator to open the manual switch 26 if it is determined to not be open.

Figure 7:
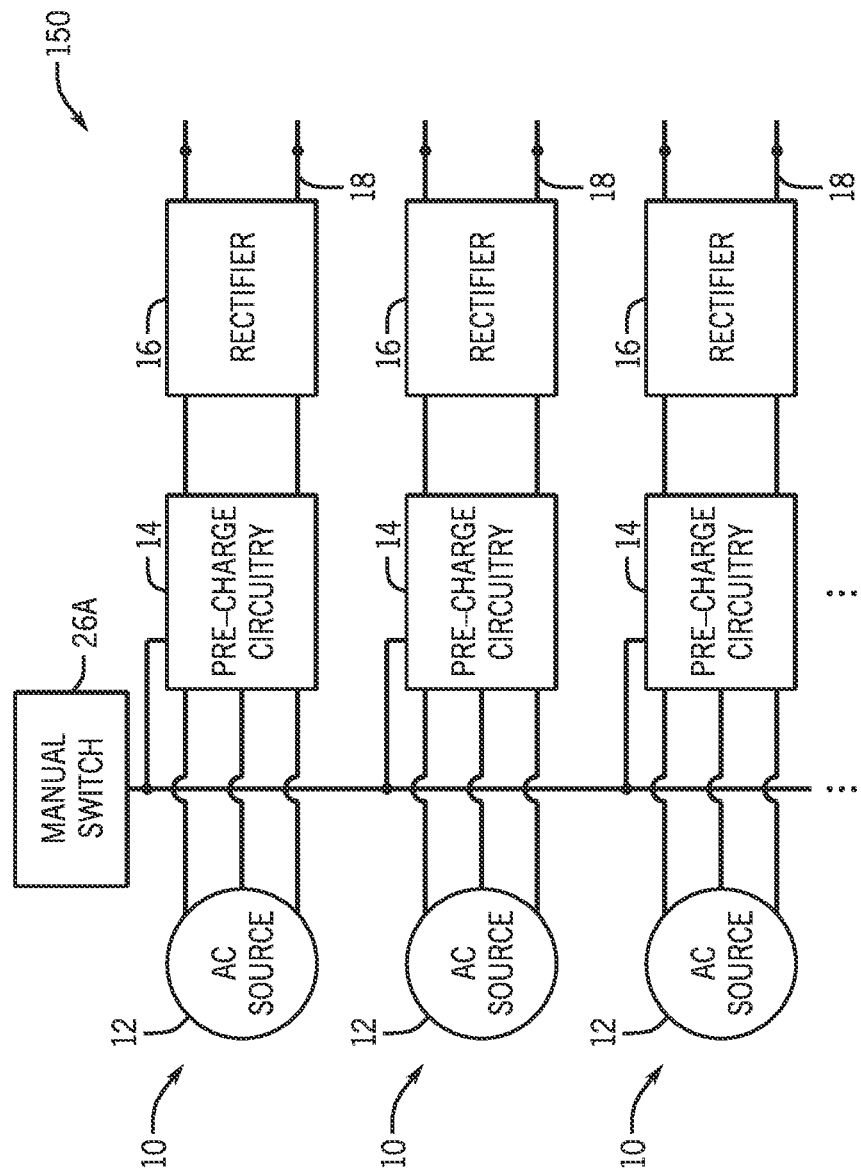
FIG. 7 is a diagrammatical representation of a power distribution network having a switch shared by multiple motor drives, in accordance with an embodiment.

Furthermore, in some embodiments, the manual switches 26 and automatic switches 32 are individually coupled to each motor drive 10 in a network of motor drives. By individually opening the manual and automatic switches 26 and 32 on one drive in fault condition, the faulted drive may be isolated from the remaining drives in the network, such that the network may still function, and appropriate attention or repairs may be given to the faulted drive. In other embodiments, the manual switches 26 and/or the automatic switches 32 may be connected to more than one motor drive 10 for further space savings. For instance in one embodiment, as illustrated in FIG. 7, one set of manual switches 26A may be connected to all the motor drives 10 in a power network 150, such that an operator may begin or reset a pre-charge operation for all connected motor drives 10 by switching one manual switch 26A.

While only certain features have been illustrated and described herein, many modifications and changes will occur to those skilled in the art. It is, therefore, to be understood that the appended claims are intended to cover all such modifications and changes.

The invention claimed is:

1. A power system, comprising:
   at least one drive module, wherein the at least one drive module comprises:
   a rectifier configured to connect to an alternating current (AC) power source, wherein the rectifier is configured to convert AC power from the AC power source to direct current (DC) power over a DC bus; and
   a pre-charge circuit connected between the AC power source and the rectifier, wherein the pre-charge circuit comprises:
   at least one pre-charge resistor;
   at least one manual switch configured to couple the at least one pre-charge resistor to the AC power source and to the rectifier when closed and disconnect the at least one pre-charge resistor from the AC source when open, wherein the at least one manual switch is configured to be manually closed by an operator;

at least one automatic switch configured to couple the AC source to the rectifier; and pre-charge control circuitry configured to detect a state of the at least one manual switch and configured to open and close the at least one automatic switch.

2. The power system of claim 1, wherein the pre-charge control circuitry is configured to apply a pre-charge current through the at least one pre-charge resistor when a voltage of the DC bus is below a threshold.

3. The power system of claim 1, wherein the pre-charge control circuitry is configured to apply a pre-charge current through the at least one pre-charge resistor when a voltage of an AC bus coupled to the AC source is below a threshold.

4. The power system of claim 1, wherein the pre-charge control circuitry is configured to close the at least one automatic switch when a voltage in the DC bus is above a threshold.

5. The power system of claim 1, wherein the pre-charge circuit comprises at least one contactor connected in series between the at least one manual switch and the at least one pre-charge resistor.

6. The power system of claim 1, wherein the pre-charge control circuitry is configured to control a flow of current through the at least one pre-charge resistor for a period of time to sufficiently charge a capacitive circuit coupled across the DC bus to a threshold.

7. The power system of claim 1, wherein the at least one automatic switch comprises at least one motorized molded case switch.

8. The power system of claim 4, wherein the pre-charge control circuitry is further configured to open the at least one automatic switch when the voltage falls below the threshold.

9. The power system of claim 5 wherein the pre-charge control circuitry is configured to open the at least one contactor after the at least one automatic switch is closed.

10. A method, comprising:

receiving a signal indicating that a manual switch has been manually closed by an operator, wherein the manual switch is configured to couple a resistor in series with an AC power source and a rectifier circuit, wherein the rectifier circuit is configured to couple to an inverter circuit via a DC bus having a capacitive circuit coupled across the DC bus;

automatically closing an automatic switch configured to couple the AC power source in series with the rectifier circuit after the manual switch has been manually closed and when the DC bus has a voltage above a threshold, wherein the manual switch is configured to provide the DC bus with the voltage above the voltage threshold via the AC power source and the resistor.

11. The method of claim 10, wherein the automatic switch automatically closes when the capacitive circuit has a voltage above the threshold.

12. The method of claim 10, comprising operating a motor drive coupled to the inverter circuit after the automatic switch is closed.

13. The method of claim 10, comprising automatically opening the automatic switch when a fault condition is detected.

14. The method of claim 10, comprising opening a contact coupled between the manual switch and the resistor after the automatic switch closes.

15. The method of claim 13, wherein the fault condition comprises one or more of a significant voltage drop in the DC bus, an opening of the manual switch while the inverter circuit is in operation, or any combination thereof.

16. A drive comprising:

a rectifier configured to convert AC power from an AC source to DC power applied to a DC bus;

a power converter coupled to the DC bus;

a capacitive circuit coupled across the DC bus;

a first switch configured to couple the AC source in series with the rectifier when closed;

a second switch configured to couple the AC source to a resistor when closed, wherein the second switch is configured to be manually closed by an operator; and control circuitry configured to:

receive a first signal indicating that the second switch has been closed; and send a second signal to the first switch when a voltage of the capacitive circuit is greater than a threshold, wherein the second signal is configured to cause the first switch to close.

17. The drive of claim 16, wherein the control circuitry is configured to disable the power converter upon the detection of a fault condition.

18. The drive of claim 16, comprising a contactor coupled between the second switch and the resistor.

19. The drive of claim 16, wherein the control circuitry is configured to send one or more gate signals to the rectifier after the first switch closes, wherein the gate signals are configured to cause the rectifier to convert the AC power into the DC power.

20. The drive of claim 16, wherein the control circuitry is configured to send a third signal to the first switch when the voltage falls below the threshold for a time period that exceeds a predetermined limit, wherein the third signal is configured to open the first switch.

21. The drive of claim 18, wherein the control circuitry is configured to send a third signal to the contactor after the first switch closes, wherein the third signal is configured to open the contactor.

22. The drive of claim 20, wherein the control circuitry is send a fourth signal to a contactor coupled between the second switch and the resistor after the first switch is opened, wherein the fourth signal is configured to close the contactor.

* * * * *